Feb. 5, 1924.  
R. H. LAWSON  
DRIVING AND STOPPING MECHANISM  
Original Filed Oct. 18, 1918  2 Sheets-Sheet 1
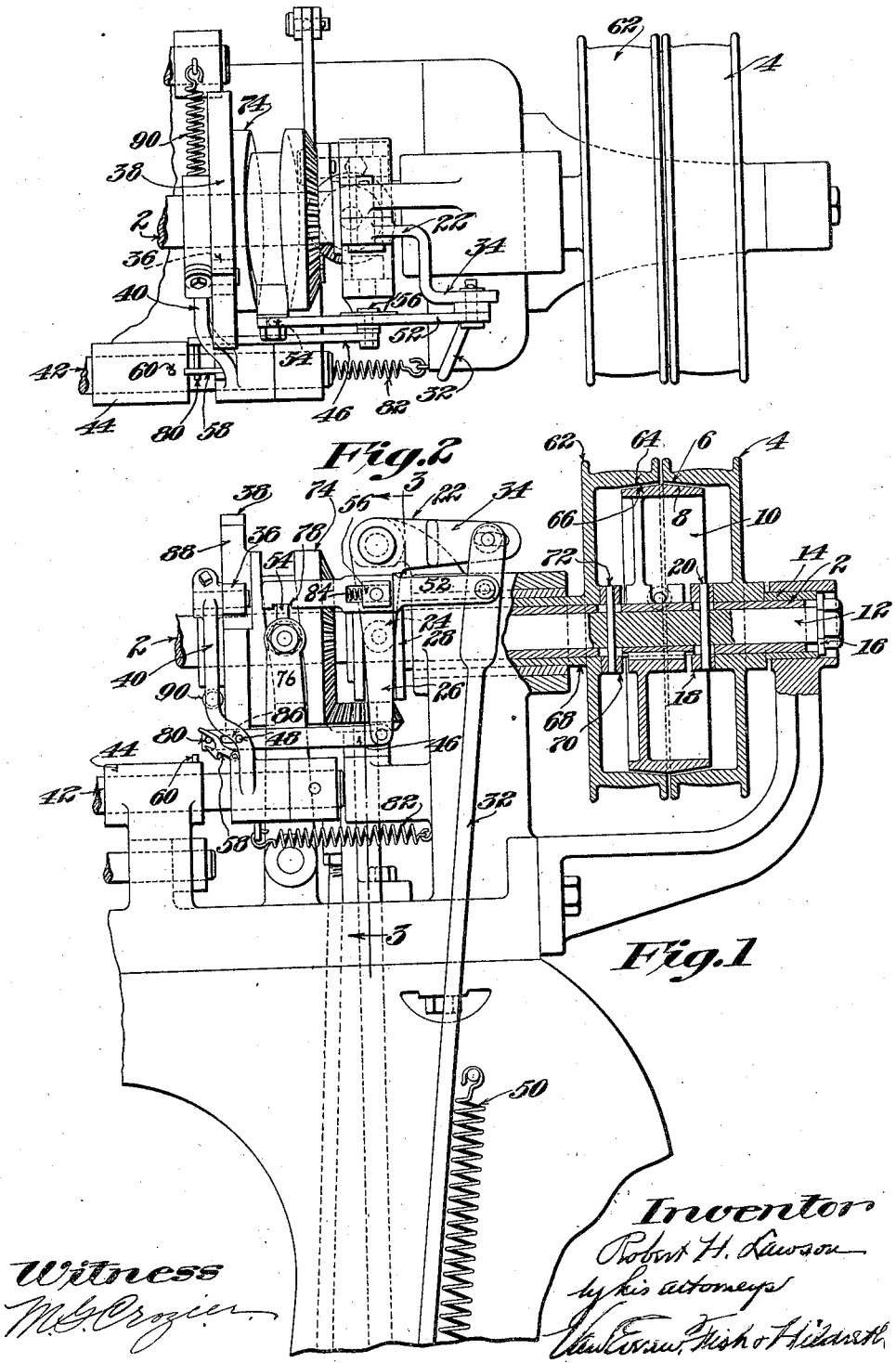

Feb. 5, 1924.
R. H. LAWSON
1,482,801
DRIVING AND STOPPING MECHANISM
Original Filed Oct. 18, 1918  2 Sheets-Sheet 2
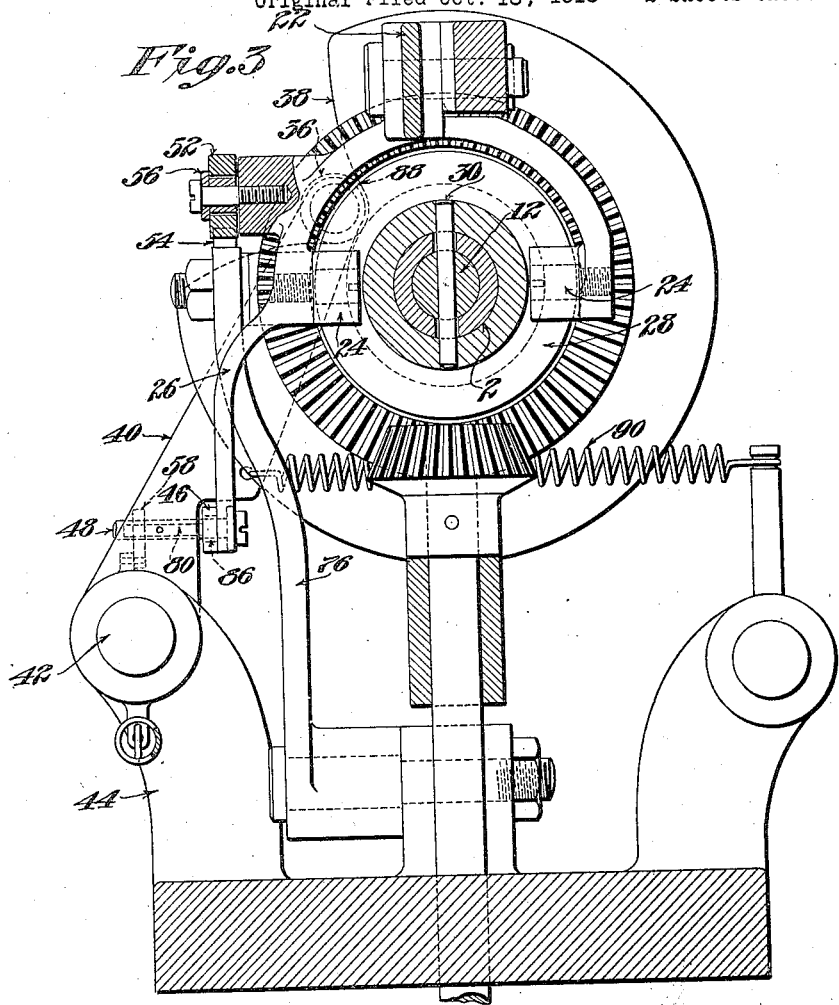
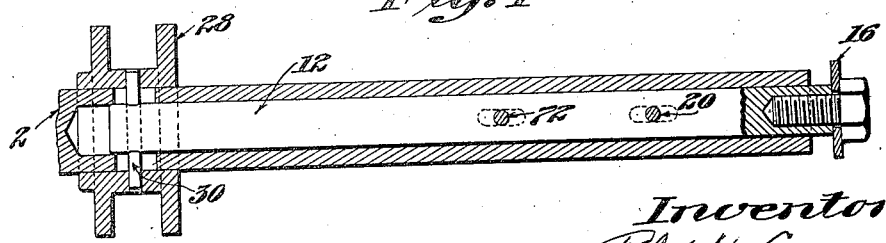

Patented Feb. 5, 1924.

1,482,801

UNITED STATES PATENT OFFICE.

ROBERT H. LAWSON, OF BEVERLY, MASSACHUSETTS, ASSIGNOR TO UNITED SHOE MACHINERY CORPORATION, OF PATERSON, NEW JERSEY, A CORPORATION OF NEW JERSEY.

DRIVING AND STOPPING MECHANISM.

Original application filed October 18, 1918, Serial No. 258,677. Divided and this application filed February 7, 1919. Serial No. 275,610.

*To all whom it may concern:*

Be it known that I, ROBERT H. LAWSON, a citizen of the United States, residing at Beverly, in the county of Essex and State of Massachusetts, have invented certain new and useful Improvements in Driving and Stopping Mechanisms; and I do hereby declare the following to be a full, clear, and exact description of the invention, such as will enable others skilled in the art to which it appertains to make and use the same.

This invention relates to driving and stopping mechanisms adapted for use in high speed machines.

The preferred embodiment of the invention is of the type employing high and low speed driving mechanisms, the high speed mechanism being in operation during the normal operation of the machine, and the low speed mechanism being thrown in shortly before the machine is stopped and acting first to reduce the speed of the machine and then to drive the machine at a low speed to stopping position. This embodiment of the invention is especially applicable to a shoe sewing machine of the type disclosed in applicant's pending application Serial No. 258,677, filed October 18, 1918, of which the present application constitutes a division.

One of the objects of the invention is to provide a novel and improved driving and stopping mechanism of the type described, which is relatively simple in construction and highly efficient in operation.

The features of the invention consist in certain constructions, combinations and arrangements of parts hereinafter described and claimed, the advantages of which will be obvious to those skilled in the art.

The several features of the invention will be readily understood from the following detailed description and the accompanying drawings, in which:—

Figure 1 is a front elevation, partly in section, of a portion of a machine in which a preferred form of the present invention is embodied; Fig. 2 is a plan view of the same; Fig. 3 is an enlarged sectional view taken on the line 3—3 of Fig. 1; Fig. 4 is a detail sectional view, partly in elevation of a control rod for the driving mechanisms.

In the drawings the invention is shown embodied in a mechanism for driving and stopping a shaft 2 from which the operating parts of a machine may be driven. The mechanism for driving the shaft during the normal operation of the machine comprises a constantly driven pulley 4, loosely mounted on the shaft, which is adapted to be clutched to the shaft by the engagement of a friction clutch face 6 on the interior thereof with a clutch face 8 on a clutch member 10 which is secured to the shaft. The pulley 4 is movable toward and from the clutch member to engage and disengage the clutch faces, or to vary the speed of the shaft, by means of a control rod 12 that is mounted to slide in an axial bore in the shaft. When the rod is shifted to the left (viewing Fig. 1), the pulley is shifted toward the clutch member through a sleeve 14 mounted to slide on the shaft and interposed between the outer end of the hub of the pulley and a washer 16 secured to the end of the control rod. When the control rod is shifted to the right the pulley 4 is shifted from the clutch member by means of a collar 18, secured to the control rod, which engages the inner end of the hub of the pulley. The collar 18 is secured to the control rod by a pin 20 that extends through slots in the shaft. The control rod is actuated by means of a bell crank lever 22 pivoted on the frame of the machine and connected to the rod by rolls 24 mounted on arms 26 of the bell crank lever, which rolls engage an annular groove in a collar 28 which is secured to the rod by means of a pin 30 that extends through slots in the shaft.

A treadle rod 32 is pivotally connected to the arm 34 of the bell crank lever and when this rod is depressed, which may be accomplished by means of a treadle mechanism (not shown) at the base of the machine, the control rod through the bell crank lever is shifted in a direction to engage the pulley 4 with the clutch member 10. At the start of this movement of the bell crank lever, and before the clutch faces on the pulley 4 and the clutch member 10 become engaged, a stop roll 36 is shifted out of engagement with a stop disk 38 carried by the shaft.

The roll 36 is mounted on the upper end of a stop arm 40, the lower end of which is mounted to slide on a shaft or rod 42 supported by a bracket 44 on the frame of the machine. The stop arm is connected to the bell crank lever by means of a link 46, having one end pivoted on the end of arm 26 of the bell crank lever and its other end in engagement with a pin 48 secured to the arm 40. When the treadle rod 32 is released, it is moved upwardly by means of a spring 50 having one end secured to the rod and its other end secured to the frame of the machine. This upward movement of the treadle rod, through the bell crank lever 22, shifts the control rod to disengage the clutch faces of the pulley 4 and the clutch member 10. Such movement of the treadle rod is limited by the engagement of the underside of one end of a bar 52 with a stud 54. The other end of the bar 52 is pivoted on the treadle rod, and the bar is centrally mounted to slide on a block 56 that is pivoted on the arm 26 of the bell crank lever and extends through a slot in the bar. The roll on the stop arm 40 is maintained out of engagement with the stop disk 38 when the treadle is released, by the engagement of a latch 58 with a stud 60, the latch 58 being pivoted on the hub of the arm 40 and the stud 60 being secured to the bracket 44. During the normal operation of the machine this latch is positioned sufficiently back of the stud 60 to permit a slight movement of the treadle rod to vary the degree of frictional contact between the clutch faces on the pulley 4 and the clutch member 10, and thereby vary the speed of the shaft 2.

The pulley 4 is adapted to drive the machine at a high speed and in order to stop the machine in a uniformly reliable manner without undue shock or wear on the parts thereof, a low speed mechanism is thrown in at a predetermined point in the rotation of the shaft after the pulley 4 is thrown out. This low speed mechanism acts first to reduce the speed of the machine and then to drive the machine at a low speed. After the low speed mechanism is in operation for a predetermined interval it is thrown out and stopping devices comprising the stop arm 40 and the stop disk 38 are rendered active to stop the machine with the shaft 2 in a predetermined angular position.

The low speed mechanism comprises a constantly driven pulley 62, loosely mounted on the shaft 2, which is adapted to be clutched to the shaft by the engagement of a clutch face 64 on the interior thereof with a clutch face 66 on the clutch member 10. The pulley 62 is movable toward and from the clutch member to engage and disengage the clutch faces by means of the control rod 12. When the control rod is shifted to the right, (viewing Fig. 1) this pulley is moved toward the clutch member through the engagement of the collar 28 with the end of an elongated sleeve or hub 68 of the pulley. When the control rod is shifted to the left, the pulley is moved from the clutch member through the engagement of a collar 70 secured to the rod with the inner end of the hub of the pulley. The collar 70 is secured to the rod by a pin 72 which extends through slots in the shaft.

The limited movement of the control rod to throw out the pulley 4, when the treadle rod 32 is released, is not sufficient to bring the pulley 62 into engagement with the clutch member. The additional movement required to be imparted to the control rod to throw in the pulley 62 at a predetermined point in the rotation of the shaft is accomplished by means of a grooved cam 74 carried by the shaft. This cam imparts a constant oscillating movement to a lever 76 having its lower end pivoted on the frame of the machine. The upper end of this lever carries the stud 54 which, at a predetermined point, in the rotation of the shaft, engages a notch 78 in the end of the bar 52, whereupon the bar is shifted to the right which, through the bell crank lever 22, shifts the low speed pulley into engagement with the clutch member 10. In order to insure the proper engagement of the pulley 62 with the clutch member 10, the pulley is yieldingly brought into engagement with the clutch member. To this end, the actuation of the bell crank lever by the bar 52 to throw in the pulley 62, is accomplished through a spring 84 interposed between the pivoted block 56 and the end of the slot in the bar. This movement of the bell crank lever, shifts the link 46 to cause a pin 80 thereon to engage a member of the latch 58 and thereby disengage the latch from the stud 60, which permits a spring 82, having one end connected to the hub of the stop arm 40 and its other end secured to the frame of the machine, to bring the roll on the stop arm into engagement with a side of the stop disk 38. In order to permit the link 46 to be thus shifted independently of the stop arm 40, the link is provided with a slot 86 through which the pin 48 extends.

At the completion of a predetermined number of degrees of rotation of the shaft 2 after the low speed pulley is thrown in, the cam 74 acts through the oscillating lever 76 and bar 52 to rock the bell crank lever 22 in a direction to disengage the low speed pulley from the clutch member, at which time a recess 88 in the stop disk 38 is brought into registry with the stop roll 36 which permits the spring 82 to carry the stop roll into the recess, and by the engagement of the roll with the walls of the recess finally stop the machine in a predetermined position. In order to ensure that the engagement of the stop roll 36 with the recess in the stop disk shall not effect the stoppage of the shaft too abruptly, the walls of the recess are inclined outwardly (Fig. 3) the stop arm 40 is pivotally mounted on the rod 42, and the roll is urged toward the bottom of the recess in the stop disk by a coiled spring 90 having one end secured to the arm and its other end secured to the machine frame. This construction permits a certain amount of oscillating movement of the shaft 2 before the stop roll is finally seated in the bottom of the recess and the shaft is finally stopped.

The operation of the mechanism illustrated in the drawings has been indicated in connection with the description of the construction, but may be briefly stated as follows: With the parts at rest, as indicated in Fig. 2, both the high speed pulley 4 and the low speed pulley 62 are out of engagement with the clutch member 10. The notch 78 of the bar 52 is in engagement with the stud 54 and the roll 36 of the stop arm 40 is in the recess 88 of the stop disk 38. A depression of the treadle rod 32 raises the bar 52 from engagement with the stud 54 and rocks the bell crank 22 in a direction to move the high speed pulley 4 into engagement with the clutch member 10. Before the pulley engages the clutch member the stop arm 40 is moved to the left as viewed in Fig. 2 so as to remove the roll 36 from the path of the cam disk 38. This movement of the stop arm 40 to the left carries the latch 58 slightly beyond the stud 60. The shaft 2 is now driven at high speed through the pulley 4 and clutch member 10. When the shaft 2 is to be stopped the treadle rod 32 is allowed to rise. This rocks the bell crank lever 22 in a direction to move the high speed pulley 4 away from the clutch member 10 and the low speed pulley 62 towards the clutch member 10. Before the low speed pulley engages the clutch member the bar 52 engages the stud 54. This stops the movement of the slow speed pulley towards the clutch member. During this movement of the bell crank lever 22 the latch 58 engages the stud 60 and during the continued movement of the bell crank lever and link 46 the stop arm is held out of the path of movement of the disk 38, the continued movement of the link 46 being permitted by the slot 86 with which the pin 48 engages. The parts remain in this position until the lever 76 is moved to a position in which the notch 78 in the bar 52 can engage the stud 54. Continued movement of the lever 76 moves the bar 52 to the right and through the spring 84 and block 56 moves the bell crank 22 in a direction to engage the slow speed pulley with the clutch member. This movement of the bell crank lever 22 through the link 46 and pin 80 raises the latch 58 and permits the spring 82 to move the stop lever towards the stop cam 38, the roll 36 bearing against the face of the cam. The speed of the shaft 2 is now reduced to that of the slow speed pulley and the shaft is driven by the slow speed pulley until the lever 76 is actuated to move the bell crank lever 22 so as to return the high and low speed pulleys to the position indicated in Fig. 1, in which position both pulleys are out of engagement with the clutch member 10. At this point in the revolution of the shaft 2 the recess 88 in the stop disk registers with the roll 36 and the roll moves into the recess, thereby stopping the rotation of the shaft.

While it is preferred to employ the specific construction and arrangement of parts shown and described, it will be understood that this construction and arrangement is not essential except so far as specified in the appended claims.

The nature and scope of the invention having been indicated and a mechanism embodying the several features of the invention having been specifically described, what is claimed is:—

1. A driving and stopping mechanism having, in combination, a shaft, a high speed driving mechanism therefor, a low speed driving mechanism therefor, means under the control of the operator for throwing out the high speed mechanism, and means for throwing in the low speed mechanism at a predetermined point in the rotation of the shaft after the high speed mechanism is thrown out and for thereafter throwing out the low speed mechanism and stopping the shaft at a predetermined point in the rotation thereof, said means including an oscillating lever, the movement of which in one direction effects said throwing in of the low speed mechanism.

2. A driving and stopping mechanism having, in combination, a shaft, a high speed driving mechanism therefor, a low speed driving mechanism therefor, means under the control of the operator for throwing out the high speed mechanism, an oscillating lever, means for actuating the lever, and means actuated by movement of the lever in one direction for throwing in the low speed mechanism after the high speed mechanism is thrown out, and actuated by movement of the lever in the opposite direction for throwing out the low speed mechanism at the completion of a predetermined interval of operation thereof.

3. A driving and stopping mechanism having, in combination, a shaft, a high speed driving mechanism therefor, a low speed driving mechanism therefor, means under the control of the operator for throwing out the high speed mechanism, and means for throwing in the low speed mechanism after the high speed mechanism is thrown out and for thereafter throwing out the low speed mechanism and stopping the shaft at a predetermined point in the rotation thereof, said means including an oscillating member, the movement of which in one direction effects said throwing in of the low speed mechanism and a cam for actuating said oscillating member.

4. A driving and stopping mechanism having, in combination, a shaft, a high speed driving mechanism therefor, a low speed driving mechanism therefor, means under the control of the operator for throwing out the high speed mechanism, an oscillating member, a cam for actuating the oscillating member, and means actuated by movement of the oscillating member in one direction for throwing in the low speed mechanism after the high speed mechanism is thrown out, and actuated by movement of the oscillating member in the opposite direction for throwing out the low speed mechanism at the completion of a predetermined interval of operation thereof.

5. A driving and stopping mechanism having, in combination, a shaft, a high speed driving mechanism therefor, a low speed driving mechanism therefor, means under the control of the operator for throwing out the high speed mechanism, and means for throwing in the low speed mechanism at a predetermined point in the rotation of the shaft after the high speed mechanism is thrown out and for throwing out the low speed mechanism at the completion of a predetermined interval of operation thereof, said means including an oscillating member, the movement of which in one direction effects said throwing out of the low speed mechanism.

6. A driving and stopping mechanism having, in combination, a shaft, a high speed driving mechanism therefor, a low speed driving mechanism therefor, means under the control of the operator for throwing out the high speed mechanism, and means for throwing in the low speed mechanism after the high speed mechanism is thrown out and for throwing out the low speed mechanism at the completion of a predetermined interval of operation thereof, said means including a cam fixed against movement longitudinally of the shaft and a lever oscillated by the cam which cooperate to control said throwing in of the low speed mechanism.

7. A driving and stopping mechanism having, in combination, a shaft, a high speed driving mechanism therefor, a low speed driving mechanism therefor, means under the control of the operator for throwing out the high speed mechanism, and means for throwing in the low speed mechanism at a predetermined point in the rotation of the shaft after the high speed mechanism is thrown out and for thereafter throwing out the low speed mechanism, said means including a cam fixed against movement longitudinally of the shaft and a lever oscillated by the cam which cooperate to control the throwing out of the low speed mechanism.

8. A driving and stopping mechanism having, in combination, a shaft, a high speed driving mechanism therefor, a low speed driving mechanism therefor, and means under the control of the operator for throwing the high speed mechanism out of operation and throwing the low speed mechanism into and out of operation, said means including an oscillating member which is connected to a member of the low speed mechanism when the high speed mechanism is thrown out, whereby the movement of the oscillating member in one direction acts to shift said member of the low speed mechanism and thereby throw in the low speed mechanism.

9. A driving and stopping mechanism having, in combination, a shaft, a high speed driving mechanism therefor, a low speed driving mechanism therefor, and means under the control of the operator for throwing the high speed mechanism out of operation and for throwing the low speed mechanism into and out of operation said means including a bell crank lever, and a cam carried by the shaft to actuate the bell crank lever to effect the throwing in of the low speed mechanism after the high speed mechanism is thrown out.

10. A driving and stopping mechanism having, in combination, a shaft, a driving mechanism therefor, stopping devices for the shaft comprising a member carried by the shaft and a shiftable relatively stationary member, means under the control of the operator for shifting the relatively stationary member out of engagement with the member carried by the shaft and for throwing the driving mechanism into and out of operation, a latch for maintaining the relatively statonary member out of engagement with the member carried by the shaft when the driving mechanism is thrown out, and means for releasing the latch at a predetermined point in the rotation of the shaft to render the stopping devices active.

11. A driving and stopping mechanism having, in combination, a shaft, a high speed driving mechanism therefor, a low speed driving mechanism therefor, a bell crank lever, means including the bell crank lever for throwing out the high speed mechanism, means including a bar pivotally connected to the bell crank lever for limiting the movement of the bell crank lever to throw out the high speed mechanism, and means actuated through the bar and bell crank lever for throwing in the low speed mechanism at a predetermined point in the rotation of the shaft and for thereafter throwing out the low speed mechanism.

12. A driving and stopping mechanism having, in combination, a shaft, a pulley driven at a high speed and a pulley driven at a low speed loosely mounted thereon, a clutch member carried by the shaft and interposed between the pulleys and adapted to severally clutch the pulleys to the shaft, means under the control of the operator for engaging and disengaging the high speed pulley and the clutch member, and means for engaging the low speed pulley and the clutch member when the high speed pulley is disengaged from the clutch member, and for disengaging the low speed pulley from the clutch member and stopping the shaft at a predetermined point in the rotation thereof.

13. A driving and stopping mechanism having, in combination, a shaft, a pulley driven at a high speed, and a pulley driven at a low speed loosely mounted thereon, means under the control of the operator for bringing the high speed pulley into and out of clutching engagement with the shaft, means controlled by a cam fixed to the shaft for frictionally clutching the low speed pulley to the shaft and for operatively disengaging the low speed pulley and shaft, and means for stopping the shaft at a predetermined point in the rotation thereof.

14. A driving and stopping mechanism having, in combination, a shaft, a high speed driving mechanism therefor, a low speed driving mechanism therefor, a lever operatively connected with the driving mechanisms, means under the control of the operator for actuating the lever to shift from the high to the low speed mechanisms, and automatic means actuated through the lever for shifting the low speed mechanism out of operative engagement with the shaft and for stopping the shaft at a predetermined point in the rotation thereof.

15. A driving and stopping mechanism having, in combination, a shaft, a pulley driven at a high speed, and a pulley driven at a low speed loosely mounted thereon, a lever operatively connected with the pulleys, means actuated through the lever for clutching the high speed pulley to the shaft, means actuated through the lever for disconnecting the high speed pulley from the shaft and for clutching the low speed pulley to the shaft, at a predetermined point in the rotation thereof, and means actuated through the lever for disconnecting the low speed pulley from the shaft and for stopping the shaft at a predetermined point in the rotation thereof.

16. A driving and stopping mechanism having, in combination, a shaft, a high speed driving mechanism therefor, a speed reducing mechanism for reducing the speed of the shaft when the high speed driving mechanism is thrown out, means for shifting from the high speed driving mechanism to the speed reducing mechanism and for throwing out the speed reducing mechanism at the completion of at least a predetermined number of degrees of rotation of the shaft after the speed reducing mechanism is thrown in, and means for stopping the shaft in a predetermined angular position after the speed reducing mechanism is thrown out comprising a stop disk carried by the shaft provided with an outwardly flaring peripheral recess and a spring pressed stop arm provided with a roll for engaging the wall of the recess and adapted to ride up on the inclined portions of the wall of the recess to permit an idle backward and forward movement of the shaft before final stoppage of the shaft.

ROBERT H. LAWSON.